March 5, 1968 D. J. BARCHOK 3,372,231

SINE WAVE STABILIZED MULTIVIBRATOR

Filed Feb. 15, 1965

Inventor
Donald J. Barchok

By Nicholas A. Camasto

Atty.

United States Patent Office 3,372,231

Patented Mar. 5, 1968

3,372,231

SINE WAVE STABILIZED MULTIVIBRATOR

Donald J. Barchok, Chicago, Ill., assignor to Admiral Corporation, Chicago, Ill., a corporation of Delaware Filed Feb. 15, 1965, Ser. No. 432,495

8 Claims. (Cl. 178—7.3)

Figure 1:
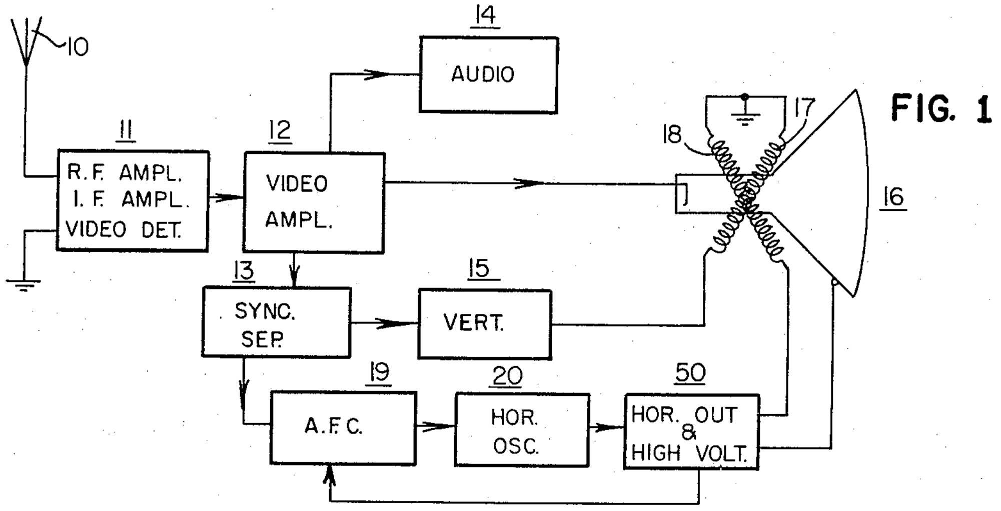

This invention relates in general to oscillators and in particular to horizontal line frequency oscillators for use in television receivers. In particular the invention is concerned with means for preventing "mode-hopping" in conventional sine wave stabilized horizontal oscillators of the multivibrator type.

Television receiver horizontal line frequency oscillators are generally free running, that is, they are usually designed to self oscillate at approximately 15,750 cycles per second (the standard television line frequency). The exact frequency of oscillation is controlled by a comparison circuit (usually referred to as automatic frequency control or AFC) which provides correction voltages for maintaining the oscillator output in exact synchronism with the line synchronizing pulses in the received television signal.

With a conventional sine wave stabilized multivibrator type oscillator it has been found that under certain, not unusual, conditions the oscillator has a tendency to become unstable and "mode-hop." The term "mode-hopping" is used to define the phenomenon which results when the horizontal oscillator changes its oscillatory rate very rapidly, generally as a one-half normal frequency aberration. This instability may be due to a number of factors, a major one of which appears to be spurious radiation, colloquially called "spook" interference such as that generated by the damper tube, which switches relatively large currents in an extremely short time. The interference is actually a band of high frequencies picked up by the antenna and appearing as a pulse (or group of pulses) in the receiver output. These radiations are especially effective in causing mode-hopping, and consequent "tearing up" of the picture, on medium to weak television signals.

A short digression into the subject of damper tube radiation may prove helpful. The steep current wavefront in the damper tube during turn-on contains many frequencies and high order harmonics. The radiations are picked up by the set antenna, especially where the antenna is of the monopole or dipole type which is built into the receiver or mounted in close proximity thereto. The radiations appear as pulses in the receiver output and affect the AFC operation. In practice the AFC circuit reacts in a manner to lower the oscillator frequency. However, if the AFC voltage goes too positive the oscillator shows a tendency to trigger on every other cycle of the sine wave stabilizing circuit output causing erratic operation and, if driven far enough positive, to mode-hop.

The circuit of the invention effectively eliminates horizontal oscillator mode-hopping. Essentially this is accomplished by prolonging the switching times of the multivibrator tubes which has the laudable effect of extending the range of AFC control voltage over which the oscillator behaves in a stable manner. As will be seen, this improvement is accomplished in an extremely simple and economical manner, requiring only the addition of a simple resistor in the disclosed embodiment of the invention.

Accordingly, the primary object of this invention is to provide a novel sine wave stabilized horizontal oscillator.

Another object of this invention is to provide a stabilized horizontal multivibrator which is controllable over a larger range of control voltages than oscillators of conventional type.

A further object of this invention is to provide a novel horizontal multivibrator circuit including a pair of vacuum tube sections wherein a grid current limiting registor is provided for one of the tube sections.

Figure 2:
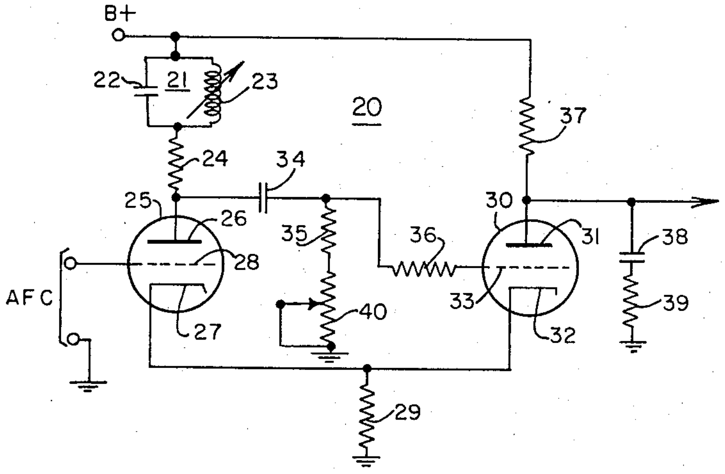
Figure 3:
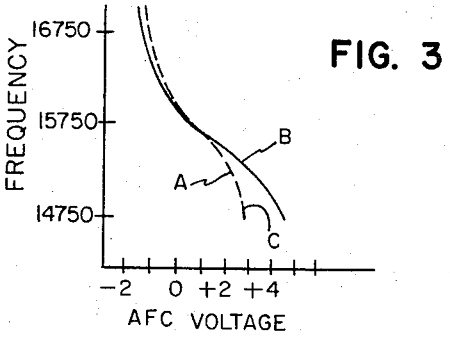

Other objects of this invention will become apparent upon reading the following specification in conjunction with the drawing in which FIG. 1 is a block diagram of a conventional television receiver; FIG. 2 is a schematic diagram of the horizontal oscillator of FIG. 1; and FIG. 3 is a graph indicating control characteristics of a conventional multivibrator horizontal oscillator and one incorporating the invention.

Referring now to FIG. 1, an antenna 10 is shown coupled to a block 11 labeled RF AMPL., IF AMPL., and VIDEO DET. This block, as well as the remaining ones in this figure, should be understood to contain conventional circuitry and components for performing the functions indicated thereon. Block 11 therefore should be understood to contain; means selectively receiving and amplifying transmitted television signals; means heterodyning the selected signal with a locally generated oscillatory signal for producing an intermediate frequency signal; means amplifying the intermediate frequency signal; and video detector means for producing the demodulated video information, synchronizing information and an audio beat signal containing the audio information. The output of the video detector in block 11 is coupled to block 12 labeled VIDEO AMPL. The video amplifier has three distinct outputs, the first of which feeds block 13 (SYNC. SEP.) containing circuitry for removing the synchronizing information, the second of which feeds block 14 labeled AUDIO, the third feeding the cathode of a picture tube 16.

The synchronizing signal separator in block 13 couples vertical synchronizing pulses to block 15 labeled VERT., which contains the vertical oscillator and output circuitry for developing the necessary deflection currents for application to vertical winding 17 of the conventional deflection yoke situated on the neck of picture tube 16. The synchronizing signal separator also provides horizontal sync. pulses to block 19 labeled AFC. Block 20, labeled HOR. OSC., contains a free running multivibrator for producing a sawtooth current at horizontal line frequency for application to block 50, labeled HOR. OUT & HIGH VOLT. The circuitry in block 50 is responsible for developing and applying the deflection currents for the horizontal winding 18 of the yoke and also for developing the high direct current potential necessary for operation of picture tube 16. A voltage, in the form of pulses of horizontal scanning frequency is fedback from block 50 to block 19, which contains the AFC circuitry.

The AFC circuitry of block 19 compares the fedback voltage pulses with synchronizing pulses from the synchronizing signal separator and generates a direct current correction voltage indicative of the degree of non-coincidence therebetween. When the sync. pulses are in synchronism with the output frequency of the horizontal oscillator, a zero or near zero correction voltage is produced. When the horizontal oscillator output frequency is higher than the frequency of the synchronizing signals, a negative control voltage is developed and, conversely, a positive control voltage is generated when the frequency of the horizontal oscillator is below that of the synchronizing pulses. This control voltage is applied to the input of the horizontal oscillator for controlling the frequency thereof.

Referring now to FIGURE 2, there is shown a detailed schematic diagram of the components in block 20 of FIG. 1. A pair of triodes 25 and 30 are shown connected in a generally conventional multivibrator circuit arrangement. While separate tube envelopes are depicted, it is well known in the art to incorporate both functions in one tube envelope. Triode 25, commonly called the oscillator section, has an anode 26, a cathode 27, and a control grid 28. Anode 26 is connected, through a load resistor 24 and a tuned circuit 21, to a source of B+ potential. Cathode 27 is connected through a common cathode resistor 29 to ground and grid 28 is connected to the AFC output.

Triode 30, normally called the discharge section, has an anode 31, a cathode 32, and a control grid 33. Anode 31 is connected to B+ potential through a load resistor 37 and cathode 32 is connected to common cathode resistor 29. A time-constant coupling circuit comprising a capacitor 34 and a resistor 36 joins anode 26 and control grid 33. The junction of capacitor 34 and resistor 36 is connected through a resistor 35 and a variable resistor 40 to ground. A resistance-capacitance network is connected across anode 31 and ground. This network comprises the sawtooth drive capacitor 38 and a resistor 39.

The operation of the multivibrator is well known in the art and will only be briefly discussed here. Assuming that triode 25 is in a conductive state, its anode-cathode current results in a potential drop across common cathode resistor 29 which tends to bias triode 30 in a non-conductive direction. During this period, capacitor 34 (which was substantially fully charged at the beginning of condition in triode 25) is discharging through triode 25 and cathode resistor 29. The remainder of this discharge path comprises variable resistor 40 (commonly called the horizontal range control) and resistor 35. The initial discharge of capacitor 34 results in a large negative voltage being applied to control grid 33 of triode 30, which in conjunction with the drop across cathode resistor 29, insures that triode 30 is in a non-conductive condition. Further, when triode 30 was driven nonconductive, the sawtooth drive capacitor 38 began to charge to B+ potential through load resistor 37 and consequently the potential at anode 31 is held down during this charging period.

As capacitor 34 discharges, the potential of control grid 33 rises, i.e. becomes less negative. Simultaneously, as the sawtooth drive capacitor 38 approaches a fully charged state, the potential of anode 31 approaches full B+. A point is reached where the operating conditions of triode 30 are favorable for conduction and it begins to draw anode-cathode current. At this time a substantially larger current flows in common cathode resistor 29, which tends to bias triode 25 in a nonconductive direction. Hence, the anode-cathode current of triode 25 decreases resulting in an increase in the potential of its anode 26. As the potential of anode 26 rises, capacitor 34 begins to charge. This charge path traverses the grid-cathode circuit of triode 30 and is traced as follows: B+, tuned circuit 21, load resistor 24, capacitor 34, resistor 36, control grid 33, cathode 32, and cathode resistor 29 to ground. There is a parallel circuit, across a portion of this path, comprising resistors 35 and 40 but, due to the relative values of impedances in comparison with resistor 36 and the grid-cathode conduction resistance of triode 30, the great majority of current flows through triode 30. The grid-cathode current flow in triode 30 drives this tube into heavy conduction, and the combination of the relatively low anode voltage of tube 25 and the large cathode bias quickly drives tube 25 in a nonconductive condition. Upon conduction of tube 30 the sawtooth drive capacitor 38 discharges therethrough.

As capacitor 34 approaches a fully charged condition, the anode voltage of triode 25 rises towards B+ and the bias developed across cathode resistor 29 diminishes. A point is soon reached (which is dependent upon the magnitude of the voltage impressed upon control grid 28 of triode 25 by the AFC circuit) where conditions are right for conduction in tube 25 and the entire cycle repeats itself.

Tuned circuit 21 comprises a capacitor 22 and a variable inductor 23. This circuit configuration will be readily recognizable by those skilled in the art as a sinewave stabilization arrangement or "flywheel" circuit. As is well known, the stabilization circuit sharpens the rise portion of the grid voltage of triode 30 and materially assists in triggering this tube into conduction at the proper time. The variable inductor 23 is generally referred to as the "horizontal hold" control.

Mode-hopping of the oscillator under the conditions outlined previously is due primarily to the rapid switching times of the tubes in the multivibrator circuit. The introduction of resistor 36 in the coupling circuit between anode 26 of triode 25 and control grid 33 of triode 30 does not materially affect the point at which tube 30 is driven into conduction but does affect its switching time or the rate at which the tube is driven from a nonconductive to a fully conductive state. The grid current limiting produced by resistor 36 effectively "softens" the turn on of triode 30 and consequently, by virtue of the action of common cathode resistor 29 and the anode voltage of triode 25, also softens the turn on of triode 25.

In FIG. 3, a graphical analysis depicting the effects of the above feature is shown. The dashed line curve labelled A indicates the frequency of the oscillator with respect to various AFC voltages for a conventional sinewave stabilized multivibrator. Point C represents the limit of stable operation. The solid curve B indicates the change obtained by the addition of resistor 36 and clearly indicates the extension of the AFC voltage range over which stable operation of the multivibrator is obtained. Thus, larger positive AFC voltages may be tolerated without causing the multivibrator to fall into erratic operation. Hence, damper tube radiations as well as repetitive and high amplitude random noise impulses are less likely to trigger the oscillator into an unstable operating mode.

By way of illustration, the following parameters are given to enable those skilled in the art to duplicate the results achieved with this invention. The tube type is from the "FQ7" series of twin triodes.

Other representative values for the circuit components are:

| | | |
|---|---|---|
| 24 | ohms | 10,000 |
| 29 | do | 1,200 |
| 35 | do | 33,000 |
| 36 | do | 4,700 |
| 37 | do | 47,000 |
| 39 | do | 27,000 |
| 40 | do | 45,000 |
| 34 | micromicrofarad | 820 |
| 38 | do | 1,500 |

What has been described is a novel horizontal oscillator of the multivibrator type which is highly stable with regard to the problem of mode-hopping. It is understood that those skilled in the art will readily envision numerous departures from and variations in the best known method of practicing the invention as described, without departing from its true spirit and scope.

The embodiments of the invention in which an exclusive property or privilege is claimed are defined as follows:

1. In a television receiver; a multivibrator oscillator including first and second vacuum tube units having respective anodes, cathodes, and control grids; an impedance common to said cathodes providing feedback voltages between said vacuum tube units; a coupling circuit joining the anode of said first tube unit to the control grid of said second tube unit; a source of direct current control voltage controlling the frequency of said multivibrator coupled to the control grid of said first tube unit; a sinewave stabilizing circuit connected in the anode circuit of said first tube unit; and means in said coupling circuit altering the switching time of said multivibrator whereby a wider range of control voltage may be tolerated without danger of said multivibrator going into uncontrolled oscillation.

2. In a television receiver; a multivibrator including a first tube section having a first anode, a first cathode, and a first control electrode; a second tube section having a second anode, a second cathode and a second control electrode; a common impedance coupled to said cathodes providing feedback information between said tube sections; a flywheel stabilizing circuit connected in the anode-cathode circuit of said first tube section; a source of direct current control voltage connected to said first control electrode controlling the frequency of said multivibrator; and a coupling circuit between said first anode and said second control electrode, said coupling circuit including a capacitance and other impedance element for prolonging the switching times of said tube sections.

3. In a television receiver; a stabilized multivibrator nominally operating at the line frequency of standard television signals, said multivibrator including a tuned circuit for providing stabilization therefor; a source of direct current control voltage coupled to the input of said multivibrator for controlling its switching rate; a common impedance element in said multivibrator for feeding back information from its output to its input; a capacitance coupling circuit conveying information from the input of said multivibrator to the output thereof, the switching rate of said multivibrator being controllable in a stable manner over a first range of control signal voltages; and resistance means in said coupling circuit for prolonging the switching time of said multivibrator without substantially affecting its switching rate whereby said multivibrator is controllable in a stable manner over a second range of control signal voltages, said second range being substantially greater than said first range.

4. In a television receiver; a stabilized multivibrator nominally operating at the line frequency of standard television signals, said multivibrator having an input stage and an output stage and including a tuned circuit for providing stabilization therefor; a source of direct current control voltage coupled to the input stage of said multivibrator for controlling the frequency thereof; a common impedance element in said multivibrator for feeding back information from said output stage to said input stage; a capacitance coupling circuit conveying information from said input stage to said output stage, said multivibrator being controllable in a stable manner over a first range of control signal voltages; and resistance means in said coupling circuit prolonging the switching times of said stages whereby said multivibrator is controllable in a stable manner over a second range of control signal voltages, said second range being substantially greater than said first range.

5. In a television receiver as claimed in claim 4 wherein said output stage comprises a vacuum tube including a control grid and wherein said resistance means in said coupling circuit comprises a resistor serially connected to said control grid, whereby grid current limiting of said output stage is effected for prolonging the switching time thereof.

6. In a television receiver, a stabilized vacuum tube multivibrator nominally operating at the line frequency of standard television signals, said multivibrator including a tuned inductance-capacitance network providing stabilization therefor; a source of direct current control voltage coupled to the input of said multivibrator for controlling the frequency thereof; a common impedance in said multivibrator for feeding back information from the output thereof to the input thereof; a capacitance charging circuit connected between and conveying information from the input of said mutivibrator to the output thereof; said capacitance charging circuit including a portion of the electron discharge path in said vacuum tube multivibrator, said multivibrator being controllable in a stable manner over a first range of control signal voltages; and resistance means in said charging circuit for prolonging the switching time of said multivibrator without substantially affecting the switching rate thereof whereby said multivibrator is controllable in a stable manner over a second range of control signal voltages, said second range being substantially greater than said first range.

7. In combination with a television receiver including an antenna mounted in close proximity to said receiver, a damper tube rapidly switching heavy currents and generating spurious high frequency signals undesirably received by said antenna and an automatic control circuit means fortuitously interpreting said spurious signals as indicative of a corrective potential being required for the line frequency oscillator of said receiver; a stabilized vacuum tube multivibrator nominally operating at the line frequency of a standard television signal, said multivibrator including a tuned inductance-capacitance network providing stabilization therefor; said automatic control circuit means coupled to and supplying a direct current control voltage to the input of said multivibrator for controlling the frequency thereof; a common impedance in said multivibrator for feeding back information from the output stage thereof to the input stage thereof; a capacitance charging circuit connected between and conveying information from the input stage of said multivibrator to the output stage thereof; said capacitance charging circuit including a portion of the electron discharge path in said vacuum tube multivibrator, said multivibrator being controllable in a stable manner over a first range of control voltage; and resistance means in said charging circuit for retarding the switching times of said stages whereby said multivibrator is controllable in a stable manner over a second range of control signal voltage, said second range being substantially greater than said first range and being inclusive of said corrective potential due to said spurious signals.

8. In combination with a television receiver including an antenna mounted in close proximity to said receiver, a horizontal oscillator; a deflection circuit damper tube rapidly switching heavy currents and generating spurious high frequency signals undesirably received by said antenna and an automatic frequency control circuit means fortuitously interpreting said spurious signals as indicative of a receiver operating condition requiring a large, corrective potential for said horizontal oscillator; said horizontal oscillator being of the vacuum tube, multivibrator type nominally operating at the line frequency of a standard television signal, said multivibrator including a tuned inductance-capacitance network providing sinewave stabilization therefor; said automatic frequency control circuit means coupled to and supplying a direct current corrective voltage to the input of said multivibrator for controlling the frequency thereof; a common impedance in the electron discharge path of said multivibrator for feeding back information from the output stage thereof to the input stage thereof; a capacitance charging circuit connected between and conveying information from the input stage of said multivibrator to the output stage thereof; said capacitance charging circuit including a portion of the electron discharge path in the output stage of said vacuum tube multivibrator, said multivibrator being controllable in a stable manner over a first range of corrective voltage; and a resistor in said charging circuit for retarding the switching times of said stages whereby said multivibrator is controllable in a stable manner over a second range of corrective voltage, said second range being substantially greater than said first range and being inclusive of said large corrective potential due to said spurious signals.

References Cited

UNITED STATES PATENTS 3,177,448 4/1965 Ashley ____________ 331—144

ROBERT L. GRIFFIN, *Primary Examiner.*

R. L. RICHARDSON, *Assistant Examiner.*